United States Patent
Qiang (10) Patent No.: US 7,593,519 B2
(45) Date of Patent: Sep. 22, 2009

(54) METHOD FOR REALIZING INTELLIGENT NETWORK SERVICE

(75) Inventor: Hua Qiang, Guangdong (CN)

(73) Assignee: Huawei Technologies Co., Ltd. (CN)

( * ) Notice: Subject to any disclaimer, the term of this patent is extended or adjusted under 35 U.S.C. 154(b) by 0 days.

(21) Appl. No.: 10/591,857

(22) PCT Filed: Feb. 1, 2005

(86) PCT No.: PCT/CN2005/000140

§ 371 (c)(1),
(2), (4) Date: May 24, 2007

(87) PCT Pub. No.: WO2005/086413

PCT Pub. Date: Sep. 15, 2005

(65) Prior Publication Data

US 2007/0297593 A1 Dec. 27, 2007

(30) Foreign Application Priority Data

Mar. 5, 2004 (CN) .................. 2004 1 0007909

(51) Int. Cl.
*H04M 3/42* (2006.01)
(52) U.S. Cl. .................. 379/201.01; 709/200; 709/201; 709/233
(58) Field of Classification Search .................. 379/ 221.08–221.09; 709/223, 105, 226, 220
See application file for complete search history.

(56) References Cited

U.S. PATENT DOCUMENTS

| 6,532,285 | B1 | | 3/2003 | Tucker et al. | |
|---|---|---|---|---|---|
| 6,560,326 | B1 | * | 5/2003 | Clark | 379/221.09 |
| 6,574,323 | B1 | | 6/2003 | Manuel et al. | |
| 6,744,872 | B2 | * | 6/2004 | Sylvie | 379/207.02 |
| 6,804,711 | B1 | * | 10/2004 | Dugan et al. | 709/223 |
| 7,269,650 | B2 | * | 9/2007 | Hamdan | 709/224 |
| 2005/0172013 | A1 | * | 8/2005 | Tan et al. | 709/220 |
| 2006/0165223 | A1 | * | 7/2006 | Dugan et al. | 379/15.02 |

\* cited by examiner

*Primary Examiner*—Curtis Kuntz
*Assistant Examiner*—Phung-Hoang J Nguyen
(74) *Attorney, Agent, or Firm*—Wood, Phillips, Katz, Clark & Mortimer (57) ABSTRACT

A method for implementing Intelligent Network (IN) services is disclosed, including: setting an IN service as a combination of several service feature, and each service feature corresponding to a node type; selecting service features from the combination, and configuring invoking relationships of the selected service features, and each invoking relationship involving a head node and a tail node, wherein a node that is always a tail node is a primary node and one primary node corresponds to one service user number; and upon receiving a service request from a user terminal, determining the primary node based on the service user number; and performing the selected service feature respectively, beginning from the primary node, according to the order of the invoking relationships, to implement the IN service. This method makes the sub-service procedures of each service user independent from each other, with high efficiency, less workload, and more flexibility and convenience.

5 Claims, 6 Drawing Sheets

METHOD FOR REALIZING INTELLIGENT NETWORK SERVICE

FIELD OF THE INVENTION

The present invention pertains to intelligent networks, and more particularly relates to a method for realizing intelligent network (IN) service.

BACKGROUND OF THE INVENTION

Currently, IN provides services based on different requirements of the subscribers, and needs a complete editing process when a user subscribes a service.

As more and more requirements come from the subscribers, demands for service customization are increasingly strong. Thus, each service may change frequently. When a service subscribed by a subscriber changes, the workload for modifying the service procedure is very hard as the current service procedure is fixed, and a great deal of manpower and time has to be spent. So, in the related art, the method for subscribing a service procedure to implement an intelligent service owns little flexibility, and may cause low efficiency and heavy workload.

SUMMARY

The invention is to provide a method for realizing IN service, so as to customize a service procedure according to different demands of subscribers and implement an IN service.

The present invention discloses a method for realizing Intelligent Network (IN) service, including:

A. setting an IN service as a combination of at least one service feature, and each service feature corresponding to a node type;

B. selecting one or more service features from the combination, and configuring one or more invoking relationships of the selected one or more service features, and each invoking relationship involving a head node and a tail node which is used for calling the head node, wherein a node that is always a tail node is a primary node and one primary node corresponds to one service user number; and C. upon receiving a service request from a user terminal, determining the primary node based on the service user number corresponding to the service request; and performing the selected one or more service feature respectively by each of the nodes corresponding to the selected one or more service features, beginning from the primary node and according to the order of the invoking relationships, to implement the IN service which the user terminal requests.

In the above solution, the selected one or more service features may include any one or any combination of the features of: welcome message playing, language selection, originating calling number screening, routing, time-based routing, date-based routing, weekday-based routing, user-selection-based routing, proportional call distribution, routing based on a circular way, authority.

In the above solution, any of the invoking relationship involving two nodes may be a relationship of direct or indirect unilateral call.

In the above solution, it may further include: configuring a table for saving nodes and a table for saving invoking relationships, and setting the index and dealing type of the current node, the index of the next node of the current node, and their corresponding relationship; the table for saving nodes comprising items of: indexes of the nodes, user sub-service identifiers, node types of service features, and parameters for indicating whether a node is a primary node; the table for saving invoking relationships comprising items of: numbers of service users, and indexes of the head node and the tail node in each invoking relationship; and in Step B, saving the information related to the selected one or more service features in the table for saving nodes and the table for saving invoking relationships respectively.

In Step C, performing the selected one or more service features respectively, may include:

C1. acquiring the node index of the primary node, node types of service features, and node indexes in the current sub-service procedure from the table for saving nodes based on the user sub-service identifiers;

C2. determining the node type of the service feature being processed currently, performing the corresponding service according to the node type determined, and on performing the service, deciding the process result of the current sub-service procedure; if the process result is a next node index, taking the next node as the current node and returning to Step C2; if the process result is an attendant number, putting the current call through to an attendant by using the attendant number.

In the above solution, Step C2 may include:

C21. querying the corresponding relationship of the dealing type of the current node and the index of the next node of the current node according to the node index of the current node, and obtaining the dealing type of the current node;

C22. determining the processing mode according to the dealing type of the current node; if the processing mode involves playing voice, performing Step C23, if the processing mode involves the next node index, performing Step C24, if the processing mode involves the attendant number, performing Step C25;

C23. obtaining the voice playing ID according to the destination identifier corresponding to the dealing type, playing the voice corresponding to the obtained voice playing ID, and terminating the current call;

C24. acquiring the next node index corresponding to the dealing type, outputting the index and type of the next node, and terminating this sub-service procedure;

C25. obtaining the attendant number corresponding to the dealing type, outputting the attendant number, and terminating this sub-service procedure.

In accordance with this invention, a service procedure can be customized by setting an IN service as a combination of service features, selecting several instances of the service features according to the demands of service users, and defining the invoking relationships between the instances of service features. By using the method in customizing service procedures, the sub-service procedures of each service user are independent from each other, which results in high efficiency, less workload, and more flexibility and convenience.

DETAILED DESCRIPTION OF PREFERRED EMBODIMENTS

In accordance with this invention, an IN service is configured as a combination of several service features. A plurality of instances of the service features are then selected as nodes according to the demands of service users, and invoking relationships between these nodes are defined to complete the customization of a service procedure. When a service request from a user terminal is received by the network, beginning from the primary node, each of the selected nodes performs its corresponding service feature to implement the IN service according to each invoking relationship between the nodes.

Figure 1:
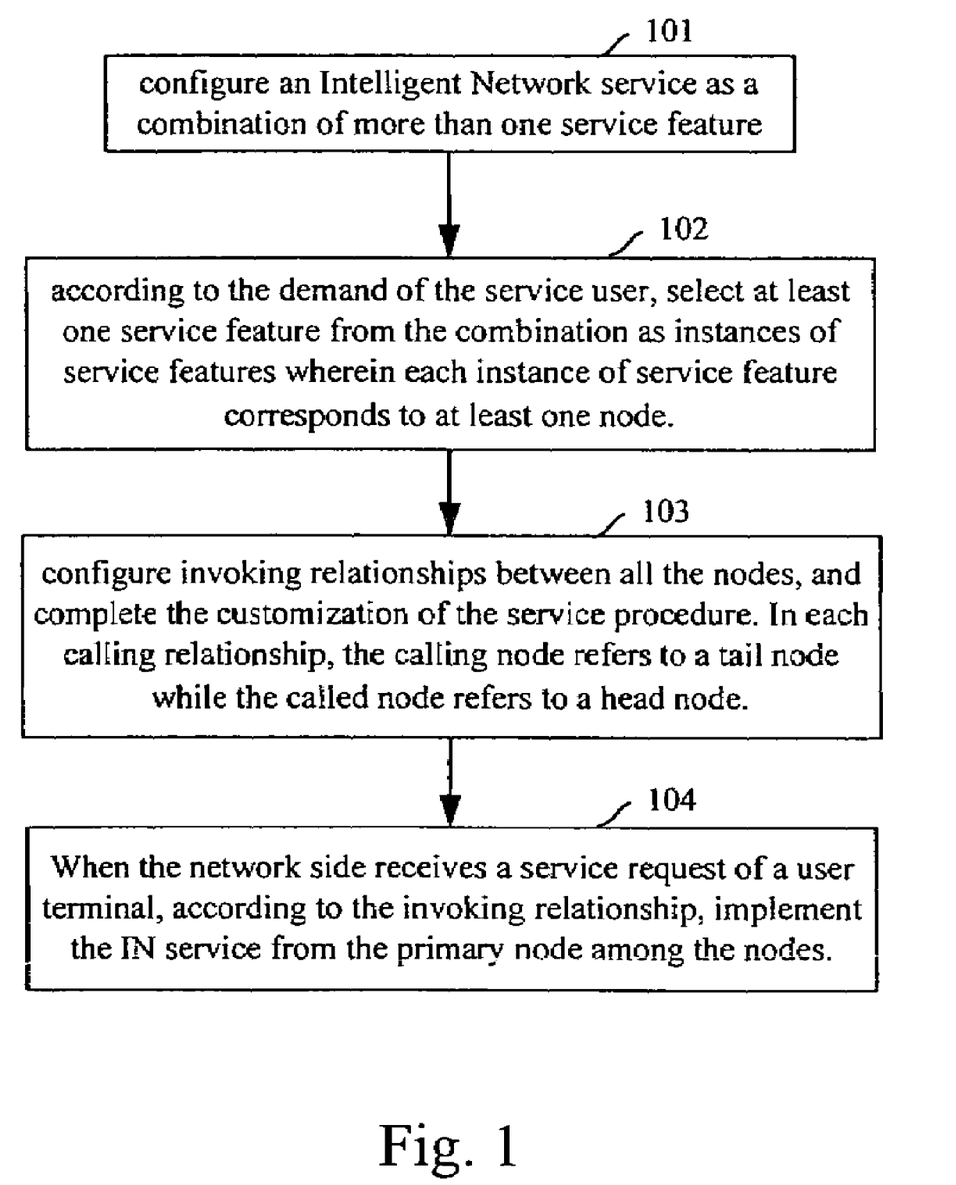
FIG. 1 is a schematic flowchart of the method according to an embodiment of this invention.

As shown in FIG. 1, the specific procedure of implementing the method in accordance with the embodiment of the invention is as follows:

Step 101: Configure an IN service as a combination of more than one service features.

The service features may include features of: welcome (WEL) message playing, language (LANG) selection, originating calling number screening (OCS), routing (OCR), time-based routing, e.g., Time of Day Based Routing (TDR), date-based routing, e.g., Day of Year Based Routing (DOY), weekday-based routing, e.g., Day of Week Based Routing (DOW), user-selection-based routing (SEL), proportional call distribution (RAT), routing based on a circular way, e.g., Way of Circular Based Routing (CYC), authority (AUTH), and etc. Obviously, service features included in the combination of service features are not limited to the above service features. It is possible to add or reduce the service features of the combination based on various needs.

Step 102: According to the need of the service user, select at least one service feature from the combination as service feature instances, and each service feature instance is configured as one or more than one node.

Step 103: Set the invoking relationships between all the nodes, and complete the customization of the service procedure. In each invoking relationship, the calling node refers to a tail node while the called node refers to a head node. If a node can only be a tail node, it is a primary node; if a node can only be a head node, it is a node with zero out-degreed; if a node can be both a head node and tail node, it is a node with non-zero out-degreed.

Step 104: After the network receives a service request from a user terminal, beginning from the primary node, each node respectively implements the IN service according to the invoking relationship between the nodes.

Figure 2:
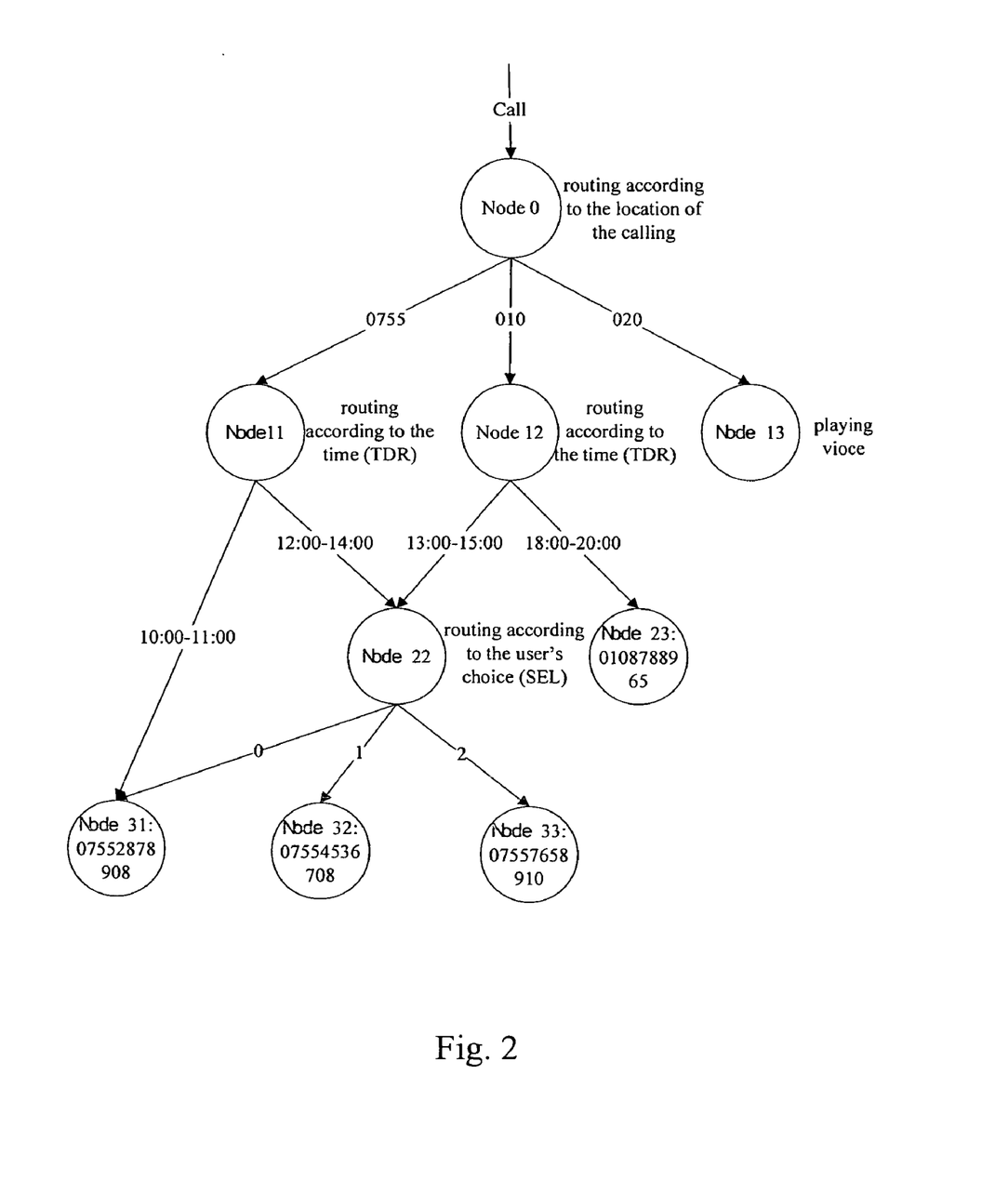
FIG. 2 is a schematic illustrating a service procedure self-defined by a subscriber.

It should be noted that the invoking relationships should be configured in Step 103 by a certain rule. In accordance with the schematic of the service procedure self-defined by a subscriber as shown in FIG. 2, the rule primarily includes:

(1) in a service procedure, there is only one practical service feature that can be configured as the primary node, and any two instances of service feature may not call each other directly or indirectly so as to avoid forming a closed loop in the service procedure which will result in a dead cycle;

(2) a node with non-zero out-degreed is definitely a service feature instance, such as Node 11 and Node 12 in FIG. 2, while a node with zero out-degreed is either an attendant number or a piece of service voice, such as Node 13, Node 23, Node 31, and etc, in FIG. 2;

(3) service features corresponding to different nodes may be identical, for example, Node 11 and Node 12 in FIG. 2 both corresponds to the same service feature of the TOD type.

Hereinafter, the solution in accordance with this invention is described in detail with reference to the accompanying figures and specific embodiments.

A service procedure customized in accordance with this invention may be taken as a directional graph, and in Step 103, according to the selected service features, the invoking relationships between the nodes are configured, like a procedure of configuring a directional graph.

Figure 4:
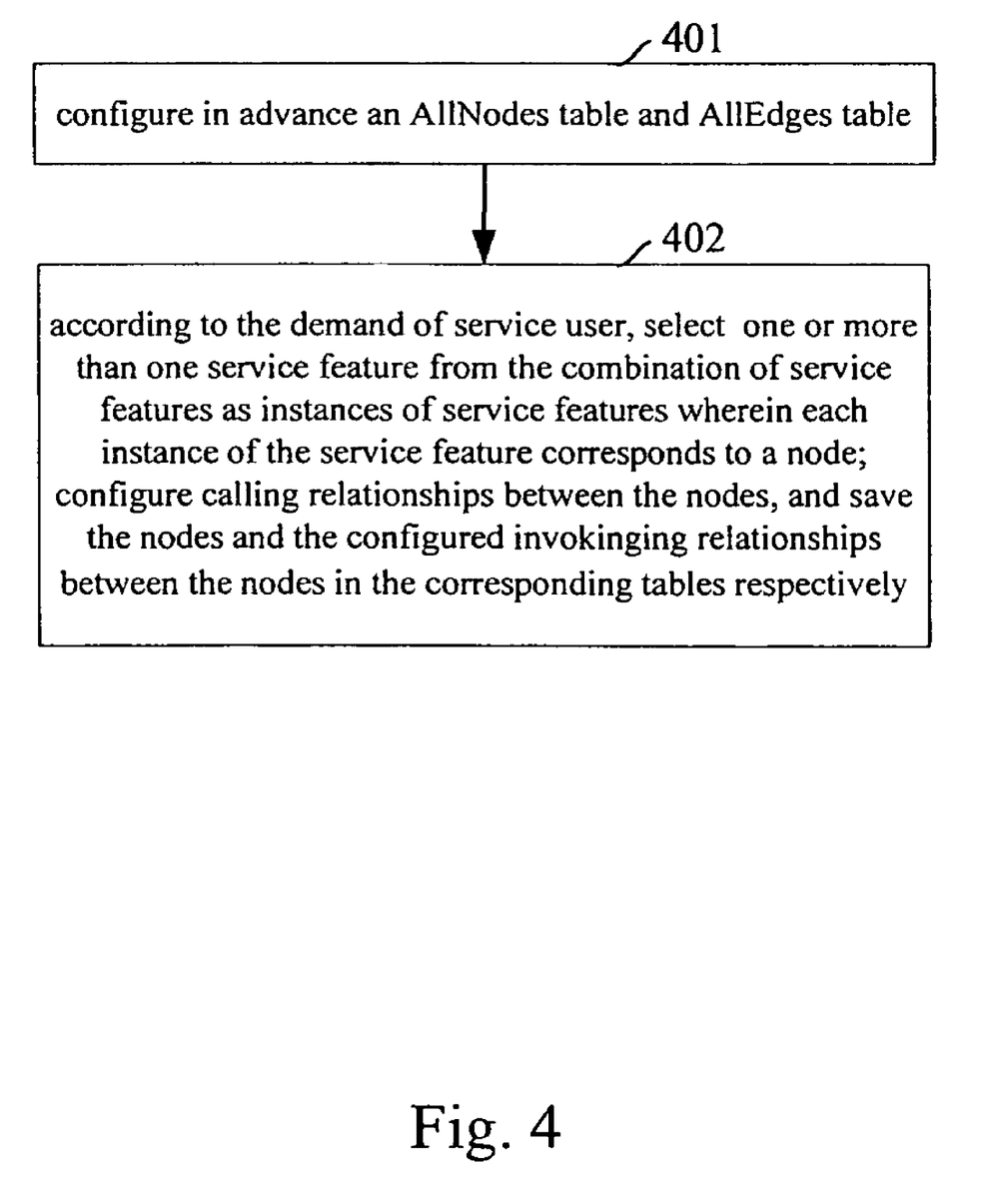
FIG. 4 is a schematic flowchart of a procedure for configuring a directional graph.

As shown in FIG. 4, the specific procedure of configuring a directional graph is as follows:

Step 401: Configure in advance a table for saving nodes and a table for saving the invoking relationships, wherein the table for saving nodes is used to save the information of all the nodes and the table for saving the invoking relationships is for saving the information of the invoking relationships between these nodes.

Table 1 is a table for saving nodes which is called the table of AllNodes, and Table 2 is a table for saving the invoking relationships which is called the table of AllEdges.

TABLE 1

| Field Name | Value Range | Description |
| --- | --- | --- |
| #NodeIndex | Automatically generated by the system, unique for all the subscribers | Index number of a node |
| User Identifier | Integer | Identifier of a subscriber sub-service |
| . . . | | Other necessary fields |
| Node Type | Node type, e.g.,:<br>1-OCS;<br>2-OCR;<br>3-TDR;<br>4-DOY;<br>5-DOW;<br>6-SEL;<br>7-RAT;<br>8-CYC;<br>9-AUTH; | Type of a service feature node |
| Primary Node | 1-a primary node<br>0-a node except for the primary node | Whether it is a primary node |

TABLE 2

| Field Name | Value Range | Description |
| --- | --- | --- |
| SubServiceNumber | | Number of a subscriber |
| . . . | | Other necessary fields |
| TailIndex | Set of all the values of the NodeIndex column in the table of AllNodes | Index of a tail node of an edge in a figure |
| HeadIndex | Set of all the values in the NodeIndex column in the table of AllNodes | Index of a head nodes of an edge in a figure |

As shown in Table 1, the AllNodes table includes the items of NodeIndex, UserIdentifier, Nodetype, and PrimaryNode. Since a call enters a service procedure, the primary node is the first node which the call meets. In the table, 1 represents a primary node while 0 represents non-primary node, i.e., a node except the primary node. And there is one and only one primary node corresponding to one sub-service.

As shown in Table 2, the table for saving the invoking relationships has saved the invoking relationships of all the service feature nodes in an already defined subscriber sub-service procedure, specifically including the items of each invoking relationship: SubServiceNumber, HeadIndex, TailIndex, and etc. In addition, there may be identical invoking relationships between two nodes while these identical invoking relationships can be saved in the table of AllEdges only once.

Step 402: Based on the subscriber's requirement, select at least one service feature from the combination of service features as service feature instances, each of which refers to a node, configure invoking relationships between the nodes, and save the invoking relationships between the nodes in the corresponding table for saving nodes, e.g., Table 1.

Suppose that a set G refers to the set of all the service feature nodes and a set G2 refers to the set of the ancestor nodes of the current node N. When the invoking relationships are being configured between the nodes, if the node N is going to call a node M, the node M can only be selected from the set of the difference of the set G and the set G2 which is supposed to be a set G1, i.e., G1=G1−G2, wherein the set G1 is the set from which the node M may be selected.

Figure 3:
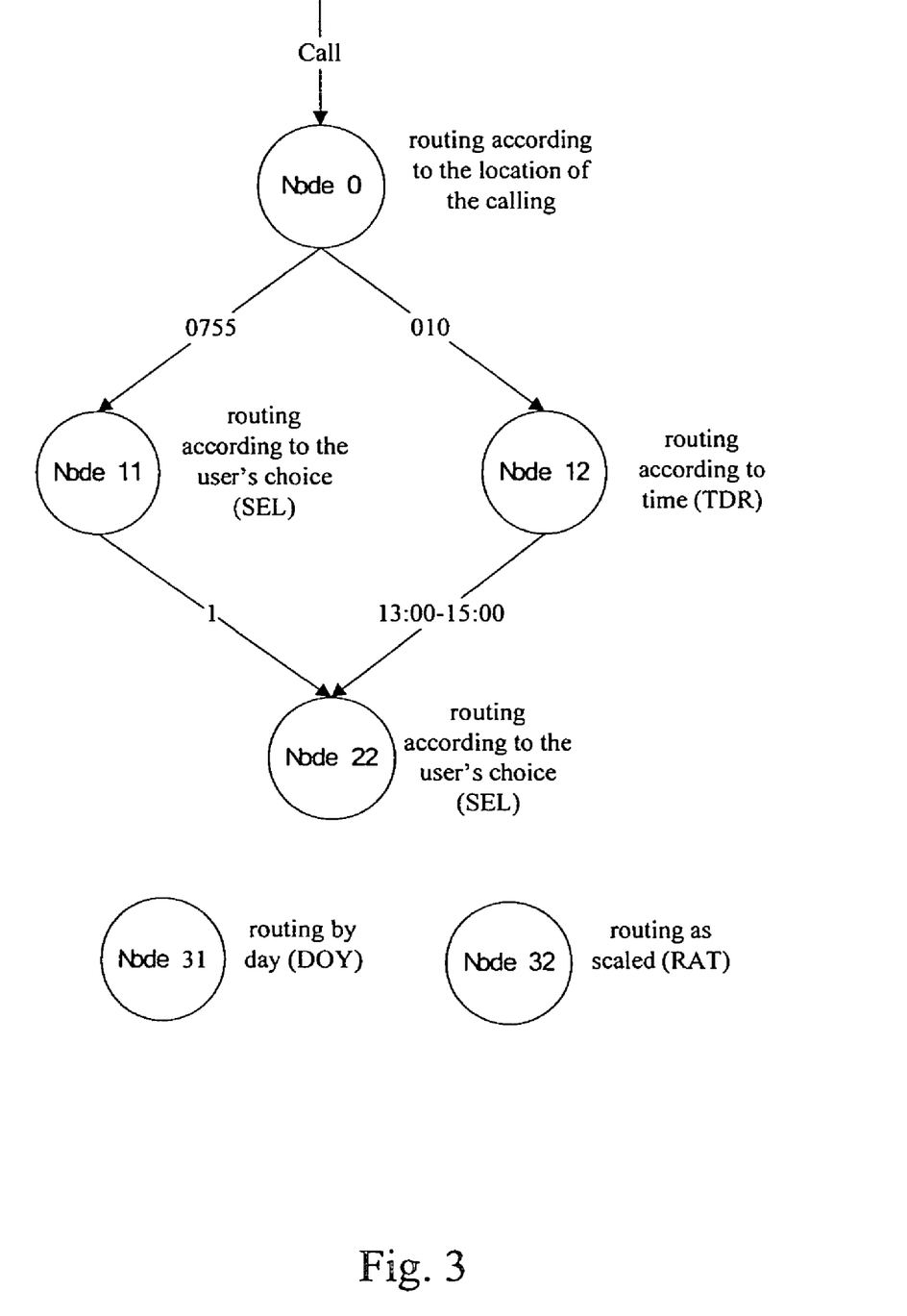
FIG. 3 is showing the relationships between the instances of service features already defined by the current subscriber.

Furthermore, as shown in FIG. 3, supposing that a Node 22 calls the node M, the set G1 from which the node M may be selected may be calculated by the following steps:

a. Directly obtain the set G by querying the AllNodes table corresponding to the structure shown in FIG. 3, and the set G includes a Node 0, Node 11, Node 12, Node 22, Node 31, and Node 32, which can be described as the expression: G={Node 0, Node 11, Node 12, Node 22, Node 31, Node 32}.

b. Query the AllEdges table corresponding to the structure shown in FIG. 3 to obtain the set G2, the ancestor nodes of the current node N, which includes a Node 0, Node 11, and Node 12, and can be described as the expression: G2={Node 0, Node 11, Node 12}. Here, the current node N is Node 22.

c. And get the set of the difference of the set G and the set G2, the set G1, which can be described as G1=G−G2={Node 31, Node 32}.

In the above solution, the set of ancestor nodes of the current node N, the set G2, has to be obtained by repeatedly querying the AllEdges table, the specific implementation procedure of which is as follows:

b1. Configure the set of ancestor nodes of the current node N as null.

b2. Search TailIndexes based on the condition of "HeadIndex=N", i.e., each HeadIndex corresponding to the TailIndexes equals N, and add all the searched out TailIndexes to the set G2.

b3. For each node P in the set G2, if the node P is not a primary node, then search TailIndexes according to the condition that "HeadIndex=P", and add all the searched out TailIndexes to the set G2. Before add a searched out TailIndexes to the set G2, determine whether the TailIndex currently ready to be added is not yet in the set G2, and if it is not yet in the set G2, then add it to the set G2.

b4. And repeat Step b3 to obtain the finally completed set G2, the ancestor nodes of the current node N.

TABLE 3

| Field Name | Value Range | Description |
| --- | --- | --- |
| #NodeIndex | | Index number of the current node |
| ... | | Other necessary fields |
| DealingType | 1-Play Voice; 2-Attendant; 3-Next Node | |
| DestMsgID | | |
| Attendant | | Phone number of an attendant |
| NextNodeIndex | | Index of the next node |

Table 3 is illustrating a service feature table for saving the service features of the corresponding node. For each service procedure that can be defined, there is a structure for saving data in the system which is similar to the one shown in Table 3. As shown in Table 3, the service features of each node include such items as, the current node's NodeIndex, DealingType, DestMsgID, Attendant, and NextNodeIndex. A DealingType may refer to any of the three kinds of exits: Play Voice, Attendant, and Next Node, wherein Play Voice represents playing voice to a terminal user and then releasing the current call, Attendant refers to connecting the current call to an attendant, and Next Node represents handing over the current call to the next node. Each service feature node that could be defined must correspond to at least one of the three exits after the normal process.

The process of implementing an IN service is hereinafter described with reference to the accompanying figures and Tables 1 and 3.

Figure 5:
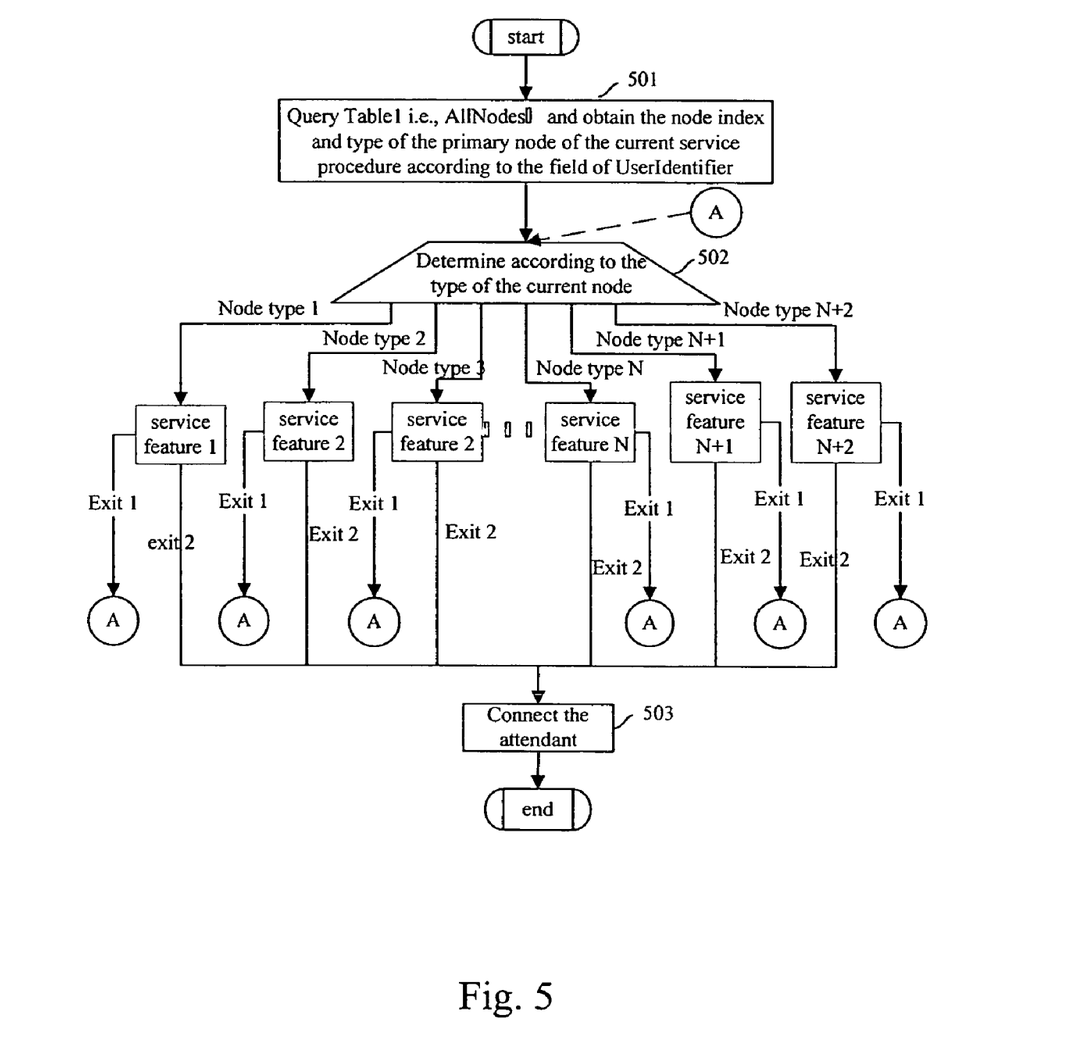
FIG. 5 is a flowchart of a main service procedure for implementing an IN service according to an embodiment of the invention.

As shown in FIG. 5, the process of a main service is as follows:

Step 501: Query Table 1 according to a Useridentifier, and obtain the NodeIndexes and types of the nodes, and the NodeIndex of the primary node of the current sub-service procedure.

Step 502: Decide the type of the service feature node currently processed, perform the appropriate service based on the type of the current service feature node being processed. And after performing the appropriate service, decide the current exit, if the decision result is the NextNodeIndex, i.e., Exit 1, take the next node as the current node and return to Step 502; if the decision result is the Attendant, i.e., Exit 2, go to Step 503.

Step 503: Put through the current call to the attendant using the number recorded in the field of Attendant.

Figure 6:
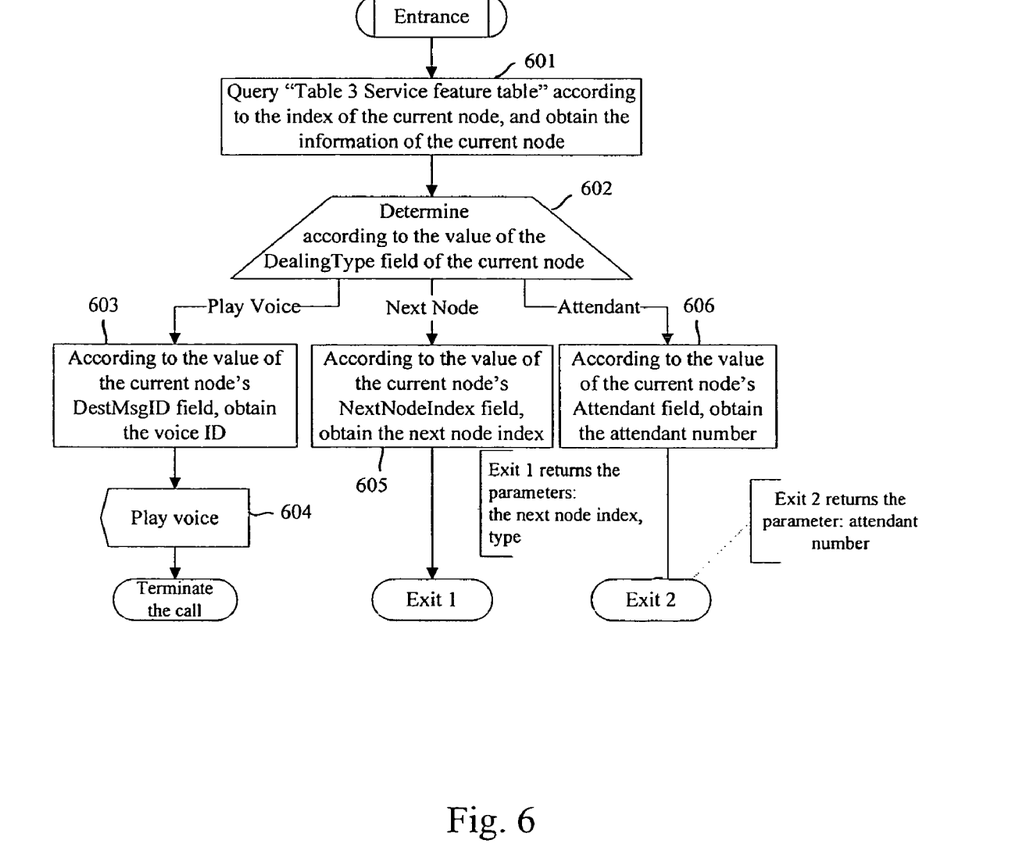
FIG. 6 is a flowchart of a sub-service procedure for implementing an IN service according to an embodiment of the invention.

As shown in FIG. 6, the process of each sub-service feature is as follows:

Step 601: Query the service feature table shown as Table 3 according to the NodeIndex of the current node, and obtain information of the DealingType of the current node.

Step 602: Determine the processing mode according to the value of the DealingType field, if the determined processing mode is Play Voice, go to Step 603; else if it is Next Node, go to Step 605; else if it is the Attendant, go to Step 606.

Step 603: Obtain the voice playing ID according to the value of the DestMsgID field which corresponds to the current node.

Step 604: Play the voice according to the obtained playing ID, and end the current call.

Step 605: Obtain the next node according to the value of the NextNodeIndex field corresponding to the current node, generate return parameters at Exit 1 which include the node index and type of the next node to be processed, and terminate this sub-service procedure.

Step 606: Acquire the attendant number according to the value of the current node's Attendant field, generate return parameters at Exit 2 which include the number of the attendant, and terminate this sub-service procedure.

The invention claimed is:

1. A method for realizing Intelligent Network (IN) service, comprising:

A. configuring a table for saving nodes and a table for saving invoking relationships, wherein the table for saving nodes is used to save the information of nodes and the table for saving the invoking relationships is for saving the information of invoking relationships between the nodes; selecting one or more service features from a combination of at least one service feature, the combination of at least one service feature being divided from an IN service and each service feature corresponding to a node type and configuring one or more invoking relationships of the selected one or more service features, saving the information related to the selected one or more service features in the table for saving nodes and the table for saving invoking relationships respectively, and each invoking relationship involving a head node and a tail node, wherein the tail node is used for calling the head node, a node that is always a tail node is a primary node and one primary node corresponds to one service user number; setting the index and dealing type of the current node, the index of the next node of the current node, and their corresponding relationship; the table for saving nodes comprising items of: indexes of the nodes, user sub-service identifiers, node types of service features, and parameters for indicating whether a node is a primary node; and the table for saving invoking relationships comprising items of: numbers of service users, and indexes of the head node and the tail node in each invoking relationship; and B. upon receiving a service request from a user terminal, determining the primary node based on the service user number corresponding to the service request; and performing the selected one or more service feature respectively by each of the nodes corresponding to the selected one or more service features, beginning from the primary node and according to the order of the invoking relationships, to implement the IN service which the user terminal requests.

2. The method of claim 1, wherein said selected one or more service features comprise any one or any combination of the features of: welcome message playing, language selection, originating calling number screening, routing, time-based routing, date-based routing, weekday-based routing, user-selection-based routing, proportional call distribution, routing based on a circular way, authority.

3. The method of claim 1, wherein any of the invoking relationship involving two nodes is a relationship of direct or indirect unilateral call.

4. The method of claim 1, in Step B, performing the selected one or more service features respectively, comprising:

B1. acquiring the node index of the primary node, node types of service features, and node indexes in the current sub-service procedure from the table for saving nodes based on the user sub-service identifiers;

B2. determining the node type of the service feature being processed currently, performing the corresponding service according to the node type determined, and on performing the service, deciding the process result of the current sub-service procedure; if the process result is a next node index, taking the next node as the current node and returning to Step B2; if the process result is an attendant number, putting the current call through to an attendant by using the attendant number.

5. The method of claim 4, Step B2 comprising:

B21. querying the corresponding relationship of the dealing type of the current node and the index of the next node of the current node according to the node index of the current node, and obtaining the dealing type of the current node;

B22. determining the processing mode according to the dealing type of the current node; if the processing mode involves playing voice, performing Step B23, if the processing mode involves the next node index, performing Step B24, if the processing mode involves the attendant number, performing Step B25;

B23. obtaining the voice playing ID according to the destination identifier corresponding to the dealing type, playing the voice corresponding to the obtained voice playing ID, and terminating the current call;

B24. acquiring the next node index corresponding to the dealing type, outputting the index and type of the next node, and terminating this sub-service procedure;

B25. obtaining the attendant number corresponding to the dealing type, outputting the attendant number, and terminating this sub-service procedure.

* * * * *